(12) United States Patent
Oda et al.

(10) Patent No.: US 8,040,004 B2
(45) Date of Patent: Oct. 18, 2011

(54) MOTOR DEVICE WITH PIN TERMINALS

(75) Inventors: Shota Oda, Nagano (JP); Hideaki Ito, Nagano (JP); Tetsuhiko Hara, Nagano (JP)

(73) Assignee: Nidec Sankyo Corporation (JP)

( * ) Notice: Subject to any disclaimer, the term of this patent is extended or adjusted under 35 U.S.C. 154(b) by 360 days.

(21) Appl. No.: 12/356,997

(22) Filed: Jan. 21, 2009

(65) Prior Publication Data
US 2009/0195094 A1    Aug. 6, 2009

(30) Foreign Application Priority Data
Jan. 21, 2008  (JP) .................... 2008-010266

(51) Int. Cl.
*H02K 11/00* (2006.01)
(52) U.S. Cl. ...... 310/71; 310/68 B; 310/68 R; 310/75 R
(58) Field of Classification Search ............. 310/68 B, 310/68 R, 71, 75 R; *H02K 11/00*
See application file for complete search history.

(56) References Cited

U.S. PATENT DOCUMENTS

| | | | | |
|---|---|---|---|---|
| 4,065,685 A | * | 12/1977 | Newell | 310/83 |
| 4,181,867 A | * | 1/1980 | Muller | 310/156.34 |
| 5,057,732 A | * | 10/1991 | Fukaya | 310/208 |
| 5,770,900 A | * | 6/1998 | Sato et al. | 310/49.13 |
| 5,977,670 A | * | 11/1999 | Numaya et al. | 310/71 |
| 6,100,612 A | * | 8/2000 | Satoh | 310/49.01 |
| 6,577,029 B1 | * | 6/2003 | Weber et al. | 310/68 R |
| 6,759,783 B2 | * | 7/2004 | Hager et al. | 310/239 |
| 6,873,076 B2 | * | 3/2005 | Kaeufl et al. | 310/91 |
| 2003/0038550 A1 | * | 2/2003 | Pan et al. | 310/68 B |
| 2009/0195094 A1 | * | 8/2009 | Oda et al. | 310/71 |

* cited by examiner

*Primary Examiner* — Quyen Leung
*Assistant Examiner* — John K Kim
(74) *Attorney, Agent, or Firm* — Cantor Colburn LLP

(57) ABSTRACT

A motor device may include a motor, a plurality of pin terminals protruded from a side face of a motor case on an outer side in a radial plane direction, and a wiring circuit board which is connected with the plurality of the pin terminals. The plurality of the pin terminals includes first pin terminals which are bent at predetermined positions in the radial plane direction toward one side in an axial direction of the motor, and second pin terminals which are bent toward the one side in the axial direction at inner sides in the radial plane direction with respect to the first pin terminals. The wiring circuit board is connected with the first pin terminals and the second pin terminals in a state where a circuit board face is directed in the axial direction.

7 Claims, 3 Drawing Sheets

MOTOR DEVICE WITH PIN TERMINALS

CROSS REFERENCE TO RELATED APPLICATION

The present invention claims priority under 35 U.S.C. §119 to Japanese Application No. 2008-10266 filed Jan. 21, 2008 the entire contents of which are incorporated herein by reference.

FIELD OF THE INVENTION

At least an embodiment of the present invention may relate to a motor device in which a wiring circuit board is connected to a plurality of pin terminals that are protruded from a side face of a motor.

BACKGROUND OF THE INVENTION

In the motor device, a plurality of pin terminals are protruded from a side face of a motor and a wiring circuit board is connected to the pin terminals for supplying an electrical power to the motor. In order to obtain this structure, a plurality of pin terminals are conventionally protruded along a straight line perpendicular to an axial direction of the motor and these pin terminals are bent to the axial direction of the motor at the same position (see Japanese Patent Laid-Open No. 2004-229378).

However, when the structure as described in the above-mentioned Patent Reference is utilized, tip end parts of the plurality of the pin terminals are arranged along a straight line and thus connected portions of the pin terminals with the wiring circuit board are arranged along the straight line. Therefore, when an external force is applied to the wiring circuit board, the connected portions of the pin terminals with the wiring circuit board may be easily damaged with stress.

SUMMARY OF THE INVENTION

In view of the problem described above, at least an embodiment of the present invention may advantageously provide a motor device in which strength of connected portions of a plurality of pin terminals protruded from a side face of a motor with a wiring circuit board is capable of being enhanced.

Further, another embodiment of the present invention may advantageously provide a motor device in which height positions of tip end parts of a plurality of pin terminals are capable of setting the same level even when the terminal pins whose total lengths are equal to each other are bent at different positions in the axial direction.

According to at least an embodiment of the present invention, there may be provided a motor device including a plurality of pin terminals and a wiring circuit board which is connected with the plurality of the pin terminals. The plurality of the pin terminals includes a plurality of first pin terminals which are bent at predetermined positions in the radial direction toward one side in the axial direction of the motor, and a plurality of second pin terminals which are bent toward the one side in the axial direction at inner sides in the radial direction with respect to the first pin terminals. The wiring circuit board is connected with tip end sides of the plurality of the first pin terminals and the plurality of the second pin terminals in a state where its circuit board face is directed in the axial direction. In accordance with an embodiment of the present invention, a flexible circuit board or a rigid circuit board may be used as the wiring circuit board.

In accordance with an embodiment of the present invention, the first pin terminal and the second pin terminal are bent at different positions in the radial direction of the motor to be extended in the axial direction and thus connected portion of the first pin terminal with the wiring circuit board and connected portion of the second pin terminal with the wiring circuit board are separated from each other in the radial direction of the motor. Therefore, strength of the connected portions of the pin terminals with the wiring circuit board is enhanced in comparison with a conventional case where connected portions of pin terminals with the wiring circuit board are arranged along a straight line manner. Accordingly, even when an external force is applied to the wiring circuit board, damage of connected portions of the pin terminals with the wiring circuit board can be prevented. Further, since the first pin terminal and the second pin terminal are bent at different positions, strength for the bent part of the pin terminal is enhanced in comparison with a conventional case where connected portions of the pin terminals with the wiring circuit board are arranged along one straight line manner.

At least an embodiment of the present invention is especially effective when the wiring circuit board is a rigid circuit board. When the wiring circuit board is a rigid circuit board, an external force applied to the wiring circuit board is easily transmitted to the connected portion with the pin terminal and thus the pin terminal may be easily damaged at the connected portion with the wiring circuit board. However, according to the embodiment of present invention, strength of connected portion of the pin terminal with the wiring circuit board is increased and thus the above-mentioned damage can be prevented.

In accordance with an embodiment of the present invention, a total length of the first pin terminal is the same as a total length of the second pin terminal. In addition, a separated distance in a pin protruding direction between a bent position of the first pin terminal and a bent position of the second pin terminal is equal to a separated distance in the axial direction between a protruded position of the first pin terminal from the side face of the motor and a protruded position of the second pin terminal from the side face of the motor. Furthermore, a tip end part of the first pin terminal and a tip end part of the second pin terminal are set to be the same height position in the axial direction. According to this structure, the height positions of the respective tip end parts of the first pin terminal and the second pin terminal are set to be the same as each other and thus the wiring circuit board can be connected with the first pin terminal and the second pin terminal easily. Further, since the total lengths of the first pin terminal and the second pin terminal are equal to each other, the first pin terminal and the second pin terminal before being bent may be used in common.

In this case, it may be structured that the tip end part of the first pin terminal and the tip end part of the second pin terminal are located at a protruded position in the axial direction from an end face on an output side of the motor case from which a motor shaft is protruded or from an end face on an opposite-to-output side of the motor case. If the tip end parts of the pin terminals are protruded in the axial direction from an end face of a motor main body and the tip end parts of the pin terminals are located at different positions in the axial direction, although a dimension in the axial direction of the motor main body is shortened, the dimension in the axial direction of the motor main body may be substantially determined by the position of the tip end part of the pin terminal which is protruded larger from the end face. On the other hand, according to the embodiment of the present invention, since the height positions of the respective tip end parts of the first pin terminal and the second pin terminal are set to be substantially the same as each other, a similar effect to a case where the dimension in the axial direction of the motor main body is shortened can be obtained.

In accordance with an embodiment of the present invention, a rotation body, which is rotated by the motor with a rotating center axial line of the motor as a rotating center or with an axial line parallel to the rotating center axial line as a rotating center, is disposed so as to face the wiring circuit board, and a sensor is mounted on the wiring circuit board, and a detected part to be detected is provided in the rotation body so as to be detected by the sensor. According to this structure, the sensor and the detected part of the rotation body can be arranged closer to each other and thus sensor sensitivity is improved.

Further, in accordance with an embodiment of the present invention, a bent position of the first pin terminal and a bent position of the second pin terminal are set so as to be an outer side and an inner side in the pin protruding direction, and the first pin terminal and the second pin terminal are connected with the wiring circuit board, which is disposed in a direction perpendicular to the axial direction of the motor, at different positions in the pin protruding direction, and a rotation body which is rotated by the motor is disposed so as to face the wiring circuit board, and a sensor for detecting rotation of the rotation body is disposed on the wiring circuit board.

In this case, it may be structured that total lengths of the first pin terminal and the second pin terminal are equal to each other, and the first pin terminal is disposed on an output side in the axial direction of the motor with respect to the second pin terminal, and the wiring circuit board is connected and fixed to the second pin terminal at a position on a near side to a side face of the motor case, and the wiring circuit board is connected and fixed to the first pin terminal at a position on a far side to the side face of the motor case. According to this structure, the wiring circuit board is fixed to and supported by the first pin terminal and the second pin terminal at two positions, i.e., at a near position and a far position to the side face of the motor case. Therefore, even when the wiring circuit board which is provided with a sensor for detecting rotation of the rotation body rotated by the motor is arranged on a side of the motor case in the direction perpendicular to the axial direction of the motor to be connected and fixed to the first pin terminal and the second pin terminal, strength of connected portion of the pin terminal with the wiring circuit board can be enhanced.

In accordance with an embodiment of the present invention, the motor may utilize a stepping motor or a geared motor in which a stepping motor and a gear train driven by the stepping motor are accommodated.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A motor device to which the present invention is applied will be described below with reference to the accompanying drawings.

Figure 1A:
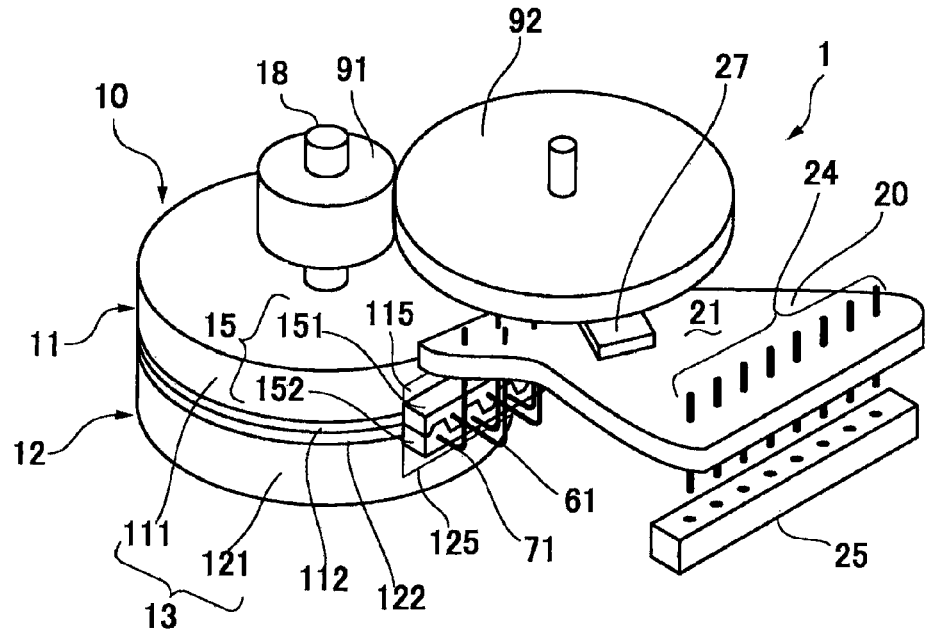
FIG. 1(a) is an explanatory perspective view schematically showing a structure of a motor device in accordance with an embodiment of the present invention.
Figure 1B:
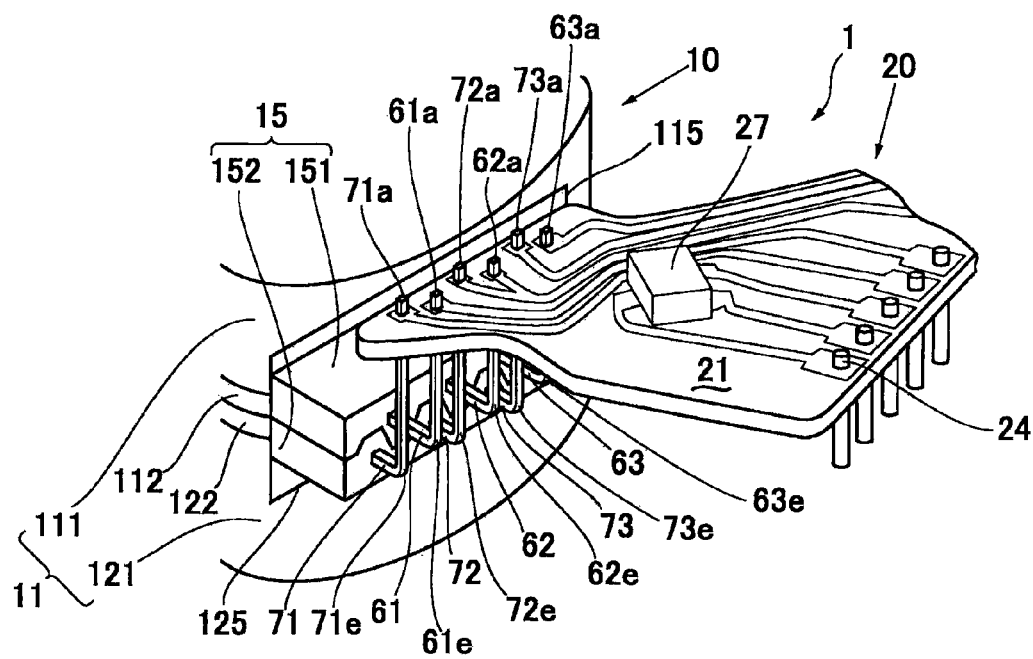
FIG. 1(b) is an enlarged perspective view showing connected portions of pin terminals with a wiring circuit board.
Figure 2A:
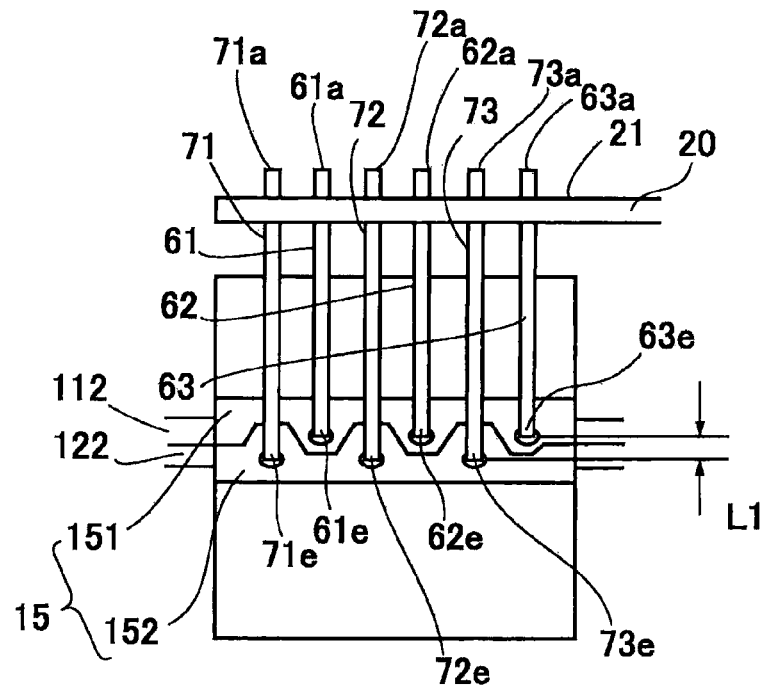
FIG. 2(a) is a front view showing a motor device in accordance with an embodiment of the present invention and in which pin terminals and their surrounding portion are viewed from an outer side in a radial direction of a motor.
Figure 2B:
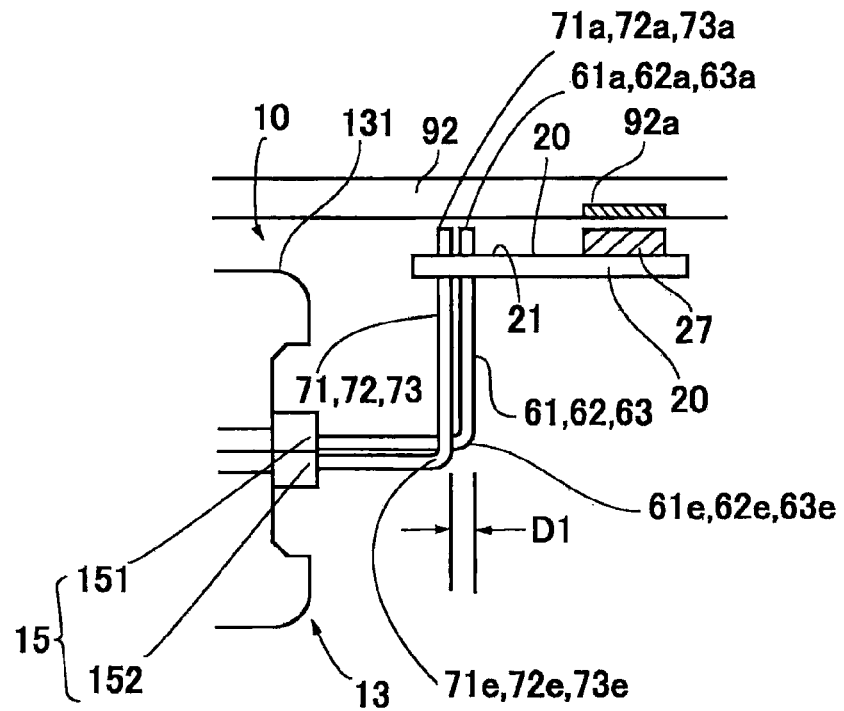
FIG. 2(b) is its side view.

FIG. 1(a) is an explanatory perspective view schematically showing a structure of a motor device in accordance with an embodiment of the present invention, and FIG. 1(b) is an enlarged perspective view showing connected portions of pin terminals with a wiring circuit board. FIG. 2(a) is a front view showing a motor device in accordance with an embodiment of the present invention and in which pin terminals and their surrounding portion are viewed from an outer side in a radial direction of a motor, and FIG. 2(b) is its side view.

As shown in FIG. 1(a), a motor device 1 in accordance with an embodiment of the present invention includes a motor 10 which is a stepping motor, six metal pin terminals in total (first pin terminals 61, 62 and 63 and second pin terminals 71, 72 and 73) which are protruded on an outer side in a radial direction of the motor 10 from a side face of a motor case 13 structuring a main body portion of the motor 10 (motor main body), and a wiring circuit board 20 whose one end side is connected to the pin terminals. The wiring circuit board 20 is disposed so as to be perpendicular to the axial direction of the motor 10 and thus its circuit board face 21 is directed to the output side of the motor 10. In other words, the wiring circuit board 20 is disposed at a side position of the motor 10 in the lateral direction which is perpendicular to the axial direction of the motor 10.

In this embodiment, a substrate of the wiring circuit board 20 is a rigid substrate (rigid circuit board) such as a phenol substrate, a glass-epoxy substrate or a ceramic substrate. A plurality of connector connecting terminals 24 for controlling the motor are fixed with solder so as to penetrate through the wiring circuit board 20 at the other end part of the wiring circuit board 20 which is located on an outer side in the radial direction of the motor. A connector 25 is connected to the connector connecting terminals 24. The first pin terminals 61, 62 and 63 and the second pin terminals 71, 72 and 73 are terminals for supplying electrical power to the coils (not shown) of the motor 10. The coil ends of the respective coils are bound on root portions of the first pin terminals 61, 62 and 63 and the second pin terminals 71, 72 and 73 and soldered.

A plurality of electrical conduction patterns for connecting the first pin terminals 61, 62 and 63 and the second pin terminals 71, 72 and 73 with the connector connecting terminals 24 are formed on the circuit board face 21 of the wiring circuit board 20. Further, a rotation detection sensor 27 for detecting rotation of the motor is mounted on the circuit board face 21 of the wiring circuit board 20. The circuit board face 21 is formed with three electrical conduction patterns for electrically connecting the rotation detection sensor 27 with the connector connecting terminals 24. In this embodiment, six pieces in total are provided for the first pin terminals 61, 62 and 63 and the second pin terminals 71, 72 and 73; i.e., for a phase "A", for an inverse-of-phase "A" and for their common potential, and for a phase "B", for an inverse-of-phase "B" and for their common potential. Further, three electrical conduction patterns are formed for connecting the sensor 27 with the connector connecting terminals 24. For two pin terminals 62 and 72, to which the common potential is applied, of the first pin terminals 61, 62 and 63 and the second pin terminals 71, 72 and 73, the electrical conduction pattern is used in common partly. Therefore, the number of the connector connecting terminals 24 is eight (8).

A motor pinion 91 is fixed to an output rotation shaft 18 of the motor 10. The motor pinion 91 is engaged with a rotation transmitting gear 92 (rotation body) which is rotated about an axial line as its rotating center that is parallel to the output rotation shaft 18 of the motor 10. An under face of the rotation transmitting gear 92 is disposed so as to face the circuit board face 21 of the wiring circuit board 20. In this embodiment, the rotation detection sensor 27 mounted on the circuit board face 21 of the wiring circuit board 20 is, for example, a magnetic sensor, and a portion of the under face of the gear 92 which faces the sensor 27 on the circuit board face 21 of the wiring circuit board 20 is provided with a detected part 92a such as a magnet (see FIG. 2(b)) which is to be detected by the rotation detection sensor 27.

In the motor 10 of the motor device 1 structured as described above, an "A"-phase stator assembly 11 and a "B"-phase stator assembly 12 are arranged so as to superpose on each other in the axial direction, and a motor case 13 is structured of an outer stator core 111 used in the "A"-phase stator assembly 11 and an outer stator core 121 used in the "B"-phase stator assembly 12. Further, the two outer stator cores 111 and 121 are formed with cut-out parts 115 and 125 which are communicated with each other and a terminal block 15 made of resin is positioned in the cut-out parts 115 and 125. The terminal block 15 is formed by means of that a first resin portion 151, which is formed at an end part of an inner stator core 112 used in the "A"-phase stator assembly 11, and a second resin portion 152, which is formed at an end part of an inner stator core 122 used in the "B"-phase stator assembly 12, are superposed on each other in the axial direction. Protruded and recessed parts are formed in the axial direction on opposite faces of the first resin portion 151 and the second resin portion 152. The first resin portion 151 and the second resin portion 152 are superposed on each other in the axial direction so that one of the protruded parts is fitted to the other of the recessed parts to form the terminal block 15. Further, side faces in the radial direction on the outer sides of the first resin portion 151 and the second resin portion 152 are structured so as to form one flat face which is parallel to the axial direction.

As shown in FIGS. 1(a) and 1(b) and FIGS. 2(a) and 2(b), in this embodiment, root portions of the first pin terminals 61, 62 and 63 are press-fitted and fixed to terminal holes which open on the outer side in the radial direction in the first resin portion 151, and root portions of the second pin terminals 71, 72 and 73 are press-fitted and fixed to terminal holes which open on the outer side in the radial direction in the second resin portion 152. Therefore, positions of the protruded parts of the first pin terminals 61, 62 and 63 on the side face of the motor 10 are arranged along a straight line, and positions of the protruded parts of the second pin terminals 71, 72 and 73 on the side face of the motor 10 are arranged along another straight line. However, the positions of the protruded parts on the side face of the motor 10 of the first pin terminals 61, 62 and 63 are separated in the axial direction from the positions of the protruded parts on the side face of the motor 10 of the second pin terminals 71, 72 and 73.

Further, all of the first pin terminals 61, 62 and 63 and the second pin terminals 71, 72 and 73 are bent at predetermined positions on the outer side in the radial direction toward the output side (one side) in the axial direction of the motor 10 where a motor pinion 91 is provided and, in the state where tip ends of the pin terminals are fitted into the land holes of the wiring circuit board 20, the pin terminals are connected to the respective lands of the wiring circuit board 20 by soldering.

In this embodiment, the first pin terminals 61, 62 and 63 are bent and extended toward the output side (one side) in the axial direction of the motor 10 from a far position on the outer side in the radial direction, in other words, from the same position far from the side face of the first resin portion 151 in the pin protruding direction. On the other hand, the second pin terminals 71, 72 and 73 are bent and extended toward the output side (one side) in the axial direction of the motor 10 from a nearer position on the inner side in the radial direction than the first pin terminals 61, 62 and 63, in other words, from the same position nearer to the side face of the second resin portion 152 in the pin protruding direction.

Moreover, the overall or total lengths of the first pin terminals 61, 62 and 63 and the second pin terminals 71, 72 and 73 are the same as each other, and the center spaced distance "D1" in the radial direction (see FIG. 2(b)) between bent positions 61e, 62e and 63e of the first pin terminals 61, 62 and 63 and bent positions 71 e, 72e and 73e of the second pin terminals 71, 72 and 73 is set to be the same as the spaced distance "L1" in the axial direction (see FIG. 2(a)) between the protruded positions of the first pin terminals 61, 62 and 63 on the side face of the motor 10 and the protruded positions of the second pin terminals 71, 72 and 73 on the side face of the motor 10. Therefore, the tip end parts 61a, 62a and 63a of the first pin terminals 61, 62 and 63 and the tip end parts 71a, 72a and 73a of the second pin terminals 71, 72 and 73 are located at the same height position in the axial direction and their respective tip end parts are protruded slightly on the output side from an end face 131 on the output side of the motor case 13.

Figure 3A:
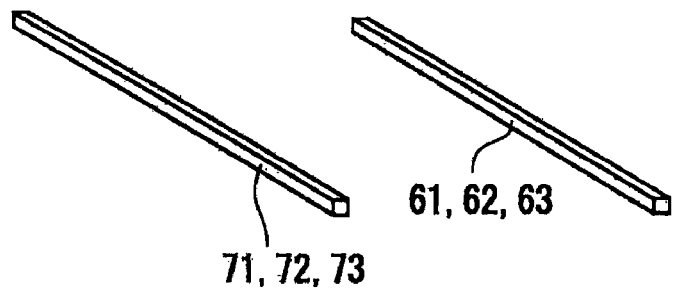
FIGS. 3(a) through 3(c) are explanatory views showing manufacturing steps for pin terminals in manufacturing steps for a motor device in accordance with an embodiment of the present invention.
Figure 3B:
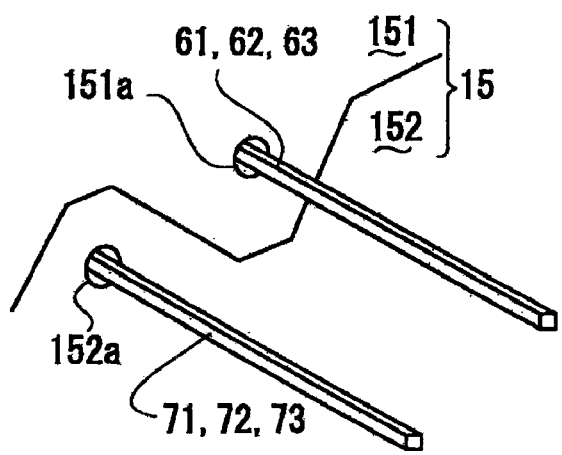
Figure 3C:
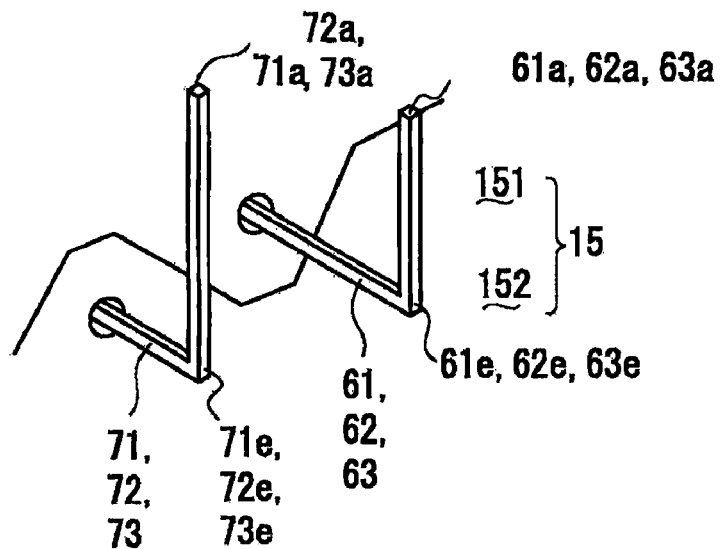

FIGS. 3(a) through 3(c) are explanatory views showing manufacturing steps for pin terminals in manufacturing steps for a motor device in accordance with an embodiment of the present invention.

In the manufacturing method for the motor device 1 in this embodiment, in order to structure the first pin terminals 61, 62 and 63 and the second pin terminals 71, 72 and 73, as shown in FIG. 3(a), the first pin terminals 61, 62 and 63 and the second pin terminals 71, 72 and 73 having the same total length are prepared. After that, as shown in FIG. 3(b), the root portions of the first pin terminals 61, 62 and 63 are press-fitted and fixed to three terminal holes 151a which respectively open toward the outer side in the radial direction in the first resin portion 151, and the root portions of the second pin terminals 71, 72 and 73 are press-fitted and fixed to three terminal holes 152a which respectively open toward the outer side in the radial direction in the second resin portion 152. Next, as shown in FIG. 3(c), the first pin terminals 61, 62 and 63 are bent in the axial direction at the far position on the outer side in the radial plane direction, and the second pin terminals 71, 72 and 73 are bent in the axial direction at the near position on the inner side in the radial plane direction.

In accordance with an embodiment of the present invention, it may be structured so that the first pin terminals 61, 62 and 63 and the second pin terminals 71, 72 and 73 having the same total length as each other have been previously bent as shown in FIG. 3(c) and then the respective root portions are press-fitted and fixed to the terminal holes.

As described above, in the motor device 1 in this embodiment, the first pin terminals 61, 62 and 63 and the second pin terminals 71, 72 and 73 are bent at different positions in the pin protruding direction or in the radial plane direction of the motor 10 to be extended in the axial direction. Therefore, the positions of connecting portions of the first pin terminals 61, 62 and 63 with the wiring circuit board 20 and the positions of connecting portions of the second pin terminals 71, 72 and 73 with the wiring circuit board 20 are different from each other in the pin protruding direction or in the radial plane direction of the motor 10. In other words, the connecting portions of the first pin terminals 61, 62 and 63 with the wiring circuit board 20 and the connecting portions of the second pin terminals 71, 72 and 73 with the wiring circuit board 20 are formed in a so-called staggered arrangement in two rows. Therefore, according to this embodiment, in comparison with a conventional structure that the connecting portions of the pin terminals with the wiring circuit board 20 are arranged along only one straight line, strength of the connecting portions of the pin terminals (the first pin terminals 61, 62 and 63 and the second pin terminals 71, 72 and 73) with the wiring circuit board 20 is high. Accordingly, even when an external force is applied to the wiring circuit board 20, connecting portions of the pin terminals with the wiring circuit board 20 can be prevented from being damaged. Further, since the first pin terminals 61, 62 and 63 and the second pin terminals 71, 72 and 73 are bent at different positions from each other in the pin protruding direction, strength of bent portions of the pin terminals becomes higher in comparison with the structure that the bent positions of the pin terminals are arranged along only one straight line.

Especially in this embodiment, since the wiring circuit board 20 is a rigid circuit board, the above-mentioned effect becomes higher. In other words, when the wiring circuit board 20 is structured of a rigid circuit board, connected portions of the pin terminals with the wiring circuit board 20 may be easily damaged because an external force applied to the wiring circuit board 20 is easily transmitted to the connected portions of the pin terminals with the wiring circuit board 20. However, according to this embodiment, since the strength of the connected portion of the pin terminals with the wiring circuit board 20 is higher, the damage can be prevented. Further, when the wiring circuit board 20 is structured of a rigid circuit board, an external force applied to the wiring circuit board 20 may easily cause the first pin terminals 61, 62 and 63 and the second pin terminals 71, 72 and 73 to deform. However, in this embodiment, the connecting portions of the first pin terminals 61, 62 and 63 with the wiring circuit board 20 and the connecting portions of the second pin terminals 71, 72 and 73 with the wiring circuit board 20 are formed in a so-called staggered arrangement in two rows. Therefore, stress is deconcentrated and thus the first pin terminals 61, 62 and 63 and the second pin terminals 71, 72 and 73 are prevented from being deformed.

Further, in this embodiment, the overall or total lengths of the first pin terminals 61, 62 and 63 and the second pin terminals 71, 72 and 73 are equal to each other, and the spaced distance "D1" in the radial plane direction between the bent positions 61e, 62e and 63e of the first pin terminals 61, 62 and 63 and the bent positions 71e, 72e and 73e of the second pin terminals 71, 72 and 73 is set to be the same as the spaced distance "L1" in the axial direction between the protruded positions of the first pin terminals 61, 62 and 63 on the side face of the motor 10 and the protruded positions of the second pin terminals 71, 72 and 73 on the side face of the motor 10. Therefore, the tip end parts 61a, 62a and 63a of the first pin terminals 61, 62 and 63 and the tip end parts 71a, 72a and 73a of the second pin terminals 71, 72 and 73 are located at the same height position in the axial direction and thus the wiring circuit board 20 can be connected easily.

Moreover, in this embodiment, the tip end parts 61a, 62a and 63a of the first pin terminals 61, 62 and 63 and the tip end parts 71a, 72a and 73a of the second pin terminals 71, 72 and 73 are located at the positions protruded in the axial direction from the end face on the output side of the motor case 13. In this case, in this embodiment, the height positions of the respective tip end parts of the first pin terminals 61, 62 and 63 and the second pin terminals 71, 72 and 73 are set to be the same as each other and thus a similar effect to a case that a dimension in the axial direction of the motor main body is shortened can be obtained. In other words, in a case where the tip end parts of the pin terminals are protruded in the axial direction from the end face of the motor case 13, when the tip end parts of the pin terminals are located at different positions in the axial direction, the dimension in the axial direction of the motor main body is substantially determined on the basis of the positions of the tip end parts of the pin terminals largely protruding from the end face even when the dimension in the axial direction of the motor main body is to be shortened. However, in this embodiment, the height positions of the respective tip end parts of the first pin terminals 61, 62 and 63 and the second pin terminals 71, 72 and 73 are set to be the same as each other and thus a similar effect to the case that the dimension in the axial direction of the motor main body is shortened can be obtained.

In addition, in this embodiment, the height positions of the respective tip end parts of the first pin terminals 61, 62 and 63 and the second pin terminals 71, 72 and 73 are set to be the same as each other and thus there is no pin terminals whose tip end part is largely protruded from the circuit board face 21. Therefore, the sensor 27 and the detected part 92a of the gear 92 can be disposed closer and thus sensor sensitivity can be improved.

In the embodiment described above, a rigid circuit board is used as the wiring circuit board 20 but a flexible circuit board may be used as the wiring circuit board 20 and, also in this case, similar effect can be obtained. Further, in the embodiment described above, the motor 10 is a stepping motor and the output rotation shaft 18 of the motor 10 is a rotation shaft of the stepping motor. However, it may be structured that a geared motor in which a stepping motor and gears are accommodated in its inside is used as the motor 10, and a pinion 91 is fixed to an output shaft which is protruded from a geared motor case, and the pinion 91 is engaged with a gear 92 for rotary force transmission, and a detected part 92a of the gear 92 is detected by a sensor 27.

Further, in the embodiment described above, the pin terminals are bent toward the output side in the axial direction but may be bent toward the opposite-to-output side in the axial direction. In this case, contrary to the embodiment described above, the pin terminals for phase "A" (upper side) are structured as the second pin terminals 71, 72 and 73 and the pin terminals for phase "B" (lower side) are structured as the first pin terminals 61, 62 and 63, and the pin terminals for phase "A" are bent at near side positions in the pin protruding direction toward the opposite-to-output side in the axial direction and the pin terminals for phase "B" are bent at far side positions in the pin protruding direction toward the opposite-to-output side in the axial direction.

Further, in the embodiment described above, the terminal block 15 is structured such that the outer side faces in the radial direction of the first resin portion 151 and the second resin portion 152 are formed in one flat face. However, the outer side faces in the radial direction of the first resin portion 151 and the second resin portion 152 may be formed in a step shape or a curved face. In this case, the bent positions in the pin protruding direction are, for example, different from each other even in the pin terminals for phase "A" (upper side). Therefore, the situation where the pin terminals are easily bent by an external force which is applied to the wiring circuit board 20 can be further surely prevented.

In addition, in the embodiment described above, six pin terminals in total are provided. However, at least one of a plurality of first pin terminals or a plurality of second pin terminals may be provided. For example, an embodiment of the present invention may be applied to a motor device 1 provided with four pin terminals in total.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor device comprising:
   a motor;
   a plurality of pin terminals which are protruded from a side face of a motor case on an outer side in a radial plane direction of the motor case; and
   a wiring circuit board which is connected with the plurality of the pin terminals;
   wherein the plurality of the pin terminals comprises:
   a plurality of first pin terminals which are bent at predetermined positions in the radial plane direction toward one side in an axial direction of the motor; and
   a plurality of second pin terminals which are bent toward the one side in the axial direction at inner sides in the radial plane direction with respect to the first pin terminals; and
   wherein the wiring circuit board is connected with tip end sides of the plurality of the first pin terminals and the plurality of the second pin terminals in a state where a circuit board face is directed in the axial direction;
   one of a bent position of a first pin terminal and a bent position of a second pin terminal is set to be an outer side in a pin protruding direction and an other of the bent position of the first pin terminal and the bent position of the second pin terminal is set to be an inner side,
   the first pin terminal and the second pin terminal are connected with the wiring circuit board which is disposed in a direction perpendicular to the axial direction of the motor at different positions in the pin protruding direction,
   a rotation body which is rotated by the motor is disposed so as to face the wiring circuit board,
   a sensor for detecting rotation of the rotation body is disposed on the wiring circuit board;
   total lengths of the first pin terminal and the second pin terminal are equal to each other,
   the first pin terminal is disposed on an output side in the axial direction of the motor with respect to the second pin terminal and the wiring circuit board is connected and fixed to the first pin terminal at a position on a far side from a side face of the motor case, and
   the wiring circuit board is connected and fixed to the second pin terminal at a position on a near side from the side face of the motor case.

2. The motor device according to claim 1, wherein the wiring circuit board is a rigid circuit board.

3. The motor device according to claim 1, wherein
   a separated distance in a pin protruding direction between a bent position of the first pin terminal and a bent position of the second pin terminal is equal to a separated distance in the axial direction between a protruded position of the first pin terminal from the side face of the motor and a protruded position of the second pin terminal from the side face of the motor, and
   a tip end part of the first pin terminal and a tip end part of the second pin terminal are set to be the same height position in the axial direction.

4. The motor device according to claim 3, wherein the tip end part of the first pin terminal and the tip end part of the second pin terminal are located at a protruded position in the axial direction from an end face on an output side of the motor case from which a motor shaft is protruded or from an end face on an opposite-to-output side of the motor case.

5. The motor device according to claim 3, further comprising
   a rotation body which is rotated by the motor with a rotating center axial line of the motor as a rotating center or with an axial line parallel to the rotating center axial line as a rotating center, and which is disposed so as to face the wiring circuit board,
   a sensor which is mounted on the wiring circuit board, and
   a detected part which is provided in the rotation body to be detected by the sensor.

6. The motor device according to claim 1, wherein the motor is one of a stepping motor and a geared motor in which the stepping motor and a gear driven by the stepping motor are accommodated.

7. A motor device comprising:
   a motor;
   a plurality of pin terminals which are protruded from a side face of a motor case on an outer side in a radial plane direction of the motor case; and
   a wiring circuit board which is connected with the plurality of the pin terminals;
   wherein the plurality of the pin terminals comprises:
   a plurality of first pin terminals which are bent at predetermined positions in the radial plane direction toward one side in an axial direction of the motor; and
   a plurality of second pin terminals which are bent toward the one side in the axial direction at inner sides in the radial plane direction with respect to the first pin terminals; and
   wherein the wiring circuit board is connected with tip end sides of the plurality of the first pin terminals and the plurality of the second pin terminals in a state where a circuit board face is directed in the axial direction,
   a total length of a first pin terminal is equal to a total length of a second pin terminal,
   a separated distance in a pin protruding direction between a bent position of the first pin terminal and a bent position of the second pin terminal is equal to a separated distance in the axial direction between a protruded position of the first pin terminal from the side face of the motor and a protruded position of the second pin terminal from the side face of the motor, and
   a tip end part of the first pin terminal and a tip end part of the second pin terminal are set to be the same height position in the axial direction.

* * * * *